UNITED STATES PATENT OFFICE.

DAVID W. ADAMSON, OF RICHFIELD, UTAH.

CEMENT.

1,338,117.     Specification of Letters Patent.     Patented Apr. 27, 1920.

No Drawing.     Application filed July 25, 1919. Serial No. 313,366.

*To all whom it may concern:*

Be it known that I, DAVID W. ADAMSON, a citizen of the United States, residing at Richfield, in the county of Sevier and State of Utah, have invented certain new and useful Improvements in Cement, of which the following is a specification.

My invention relates to the manufacture of cement, and has for its object to provide an economical, quick setting cement for use as a hard finish in plastering and other places where Keene cement is used.

In the manufacture of quick setting, hard finish plaster commonly called Hardwall, it has been the practice to mix calcined gypsum ore, after it has been comminuted, with some sand and a fibrous material as a binder, also in making Keene cement to mix calcined gypsum ore after it has been comminuted with potash alum, and, I have discovered, and by experiments have ascertained that a much harder, firmer setting and tougher plaster or cement may be made by my process, and one which may be sold much cheaper than has previously been done.

The present invention consists of calcining the massive varieties of gypsum ore at a temperature of about seven hundred degrees centigrade to drive off the sulfur and moisture usually found in such ore. When the calcined ore has cooled, I then crush or in any way comminute said calcined gypsum to pass a fifty mesh screen. Also I calcine alunite ore, as extracted from the mines, more particularly known as hydrous potassium aluminum sulfate, at a temperature of about seven hundred degrees centigrade to render the potash and alum soluble in water, and when said calcined alunite ore has cooled I crush it to the same fineness of the said gypsum, and mix ninety per cent. of the said comminuted gypsum with ten per cent. of the comminuted alunite ore. The calcining of the gypsum and alunite ore at a temperature varying from 600 to 800 degrees renders both soluble in water and when mixed in the proportions stated and rendered plastic by the addition of water the plaster produced will set quicker, have a harder, smoother finish and be much tougher than has been secured by other cements.

Having thus described my invention I desire to secure by Letters Patent and claim:—

1. As a new article of manufacture, a cement comprising calcined and comminuted gypsum and calcined alunite ores.

2. As a new article of manufacture, a cement comprising a mixture of calcined and comminuted gypsum and calcined alunite in the proportion of nine per cent. gypsum and 1 per cent. alunite.

3. A composition of matter consisting of ninety per cent. gypsum ore and ten per cent. alunite ore, both calcined at a temperature of 600 to 800 degrees centigrade comminuted and thoroughly mixed.

In testimony whereof I have affixed my signature.

DAVID W. ADAMSON.